United States Patent [19]

Sheets

[11] Patent Number: 5,059,264
[45] Date of Patent: Oct. 22, 1991

[54] AQUEOUS INPRESS PRIMER SEALER FOR HARDBOARD MANUFACTURING

[75] Inventor: Harold J. Sheets, Brook Park, Ohio

[73] Assignee: The Glidden Company, Cleveland, Ohio

[21] Appl. No.: 457,094

[22] Filed: Dec. 26, 1989

[51] Int. Cl.$^5$ ................................................. B27N 3/00
[52] U.S. Cl. .................................... 156/62.2; 427/393; 428/151
[58] Field of Search ........................ 156/62.2; 427/393; 428/151

[56] References Cited

U.S. PATENT DOCUMENTS 3,983,307 9/1976 Power et al. .................... 428/151 X
4,017,434 4/1977 Suzui et al. ..................... 524/510 X
4,505,986 3/1985 Geerdes et al. .................. 427/393 X Primary Examiner—David A. Simmons
Assistant Examiner—James J. Engel, Jr.
Attorney, Agent, or Firm—Thomas M. Schmitz

[57] ABSTRACT

An aqueous dispersed primer-sealer composition applied to a surface layer of overlay paper or surface mat provides an impregnated surface layer for use in manufacturing hardboard products by hot pressing in a molding operation. The primer sealer provides a finished surface as well as defect-free surface from the molding surface. The primer-sealer can be pigmented and is based on a polymeric binder composition containing melamine resin, carboxyl functional acrylic emulsion copolymer, vinyl-acetate-vinyl versatate copolymer, emulsified fatty acid, and polyvinyl alcohol.

6 Claims, No Drawings

AQUEOUS INPRESS PRIMER SEALER FOR HARDBOARD MANUFACTURING

This invention relates to an improved process for manufacturing prefinished hardboard products such as fiberboard, particle board, and other board fabricated from fibers or wood chips consolidated under pressure and heat to form an integral board material. Other particularly formed objects can be produced by hot pressing layers of fibrous materials in matched metal die presses. Important features in the hardboard manufacture process include surface sealing of the hardboard product and obtaining a clean release of the pressured hardboard from the hot press mold.

BACKGROUND OF THE INVENTION

Hardboard, fiberboard, particleboard and similar boards are fabricated from wood fibers or chips and consolidated under heat and pressure. Prefinished hardboard is made by consolidating lignocellulosic fibers under pressure in a press followed by application of one or more primer coats and topcoats. When waferboard, hardboard, or particleboard mat are pressed under heat and pressure in a press to form the various types of board, a press release is needed to prevent the board from sticking to the press plates. Resins, oils, sugars, and the like in the wood chips or fibers migrate to the surface and cause sticking pressplate buildup. Due to the numerous resinous and lignocellulose materials present in the fibers and chips used in hardboards, sticking to the hot mold is quite a common problem even if a mold release agent is used for coating the mold surface. A further problem in hardboard production is often experienced in the end product wherein the hardboard product surface is subsequently finished in a subsequent process. The hardboard surface must further exhibit excellent holdout to decorative paint coating or patterns so as to avoid uneven or excessive absorption of the paint into the fiberboard surface. The pressed board surface is rough and porous giving poor appearance and paint holdout. Current paper overlay coatings applied to board surface to upgrade the board surface are pigmented melamine-thermoset acrylics which tend to stick to the press plates during lamination of the paper to the board. The surface sealers or coatings require a prepress sealer or press plate release to get good plate release and prevent plate buildup.

Prepress sealers are shown in U.S. Pat. No. 4,201,802 and U.S. Pat. No. 2,635,976, and U.S. Pat. No. 4,009,073. Prepaint sealers are shown in U.S. Pat. No. 4,627,999.

It now has been found that a water reducible inpress primer/sealer developed with an internal crosslinker system can be applied as a primer/sealer to resin impregnated, adhesive backed overlay paper and dried (B staged). This primed dried paper can be laminated to a fiberboard composite such as waferboard, particle board, hardboard, or hardboard mat by heat and high pressure in a suitable press, immediately after coating and drying the paper or even up to six months after coating the paper. The coated paper upgrades the rough surface of the waferboard, particle board or hardboard to a primed smooth or textured surface, with good release and no excessive buildup on the press caulplates.

The inpress primer/sealer of this invention has excellent package stability in the can and excellent stability when applied to the overlay paper and flash dried. The coated overlay paper can be stacked in sheets or rolled into a roll with no blocking in the stack or roll. The coated paper can be laminated to the board in a smooth or textured surface with no cracking in deep textures as well as good surface appearance and hiding. The coated paper overlay does not contribute to plate buildup or need extra release or plate treatment. These and other advantages of this invention will become more apparent by referring to the detailed description and illustrative examples.

SUMMARY OF THE INVENTION

Briefly, the invention is based on an aqueous dispersed primer/sealer composition comprising by weight of resin solids between 15% and 40% methoxylated melamine resin, between 30% and 60% thermosetting acrylic copolymer latex, between 5 and 25% vinyl acetate-vinyl versetate copolymer latex, between 3% and 15% emulsified fatty acid, and between 3% and 15% polyvinyl alcohol where the composition can contain opacifying and filler pigments. The primer/sealer composition can be applied to overlay paper for hardboard products and the like, dried under heat, then laminated to hardboard, waferboard, or the like, in a press under heat and pressure for time sufficient to laminate the coated overlay paper to the board core. Upon opening of the press, the laminated board exhibits no sign of picking or sticking to the press plate.

DETAILED DESCRIPTION OF THE INVENTION

The primer/sealer combination of this invention comprises methoxylated melamine resin, thermosetting acrylic latex, vinyl acetate-vinyl versetate latex, emulsified fatty acid, and polyvinyl alcohol.

Referring first to the methoxylated melamine, useful melamines are the reaction products of ureas and melamines with aldehydes further etherified to some extent with an alcohol. Examples of aminoplast resin components are urea, ethylene urea, thiourea, melamine, benzoguanamine and acetoguanamine. Aldehydes useful in this invention are formaldehyde, acetaldehyde and propionaldehyde. The aminoplast resins, preferably, are utilized in the ether form wherein the etherifying agent is a monohydric alcohol containing from 1 to about 8 carbon atoms. Examples of aminoplast resins are methylol urea, dimethoxymethylol urea, butylated polymeric urea-formaldehyde resins, hexamethoxymethyl melamine, methylated polymeric melamine formaldehyde resin and butylated polymeric melamine formaldehyde resin.

Melamine resins typically include aminoplasts such as melamine, benzoguanamine, acetoguanamine, and urea resins such as ureaformaldehyde. Commercially available aminoplasts which are water soluble or water dispersible for the instant purpose include Cymel 301, Cymel 303, Cymel 370, and Cymel 373, all being products of American Cyanamid, said aminoplasts being melamine based, e.g., hexamethoxy-methyl melamine or methylated or butylated ureas. Other suitable aminoplast resins are of the type produced by the reaction of aldehyde and formoguanamine; ammeline; 2-chlor-4,6-diamine-1,3,5-triazine; 2-phenyl-p-oxy-4,6-diamino-1,3,5-triazine; and 2,4,6-triethyl-triamino-1,3,5-triazine. The mono-, di-, or triaryl melamines, such as 2,4,6-triphenyl-triamino-1,3,5-triazine, are preferred. Other aldehydes used to react with the amino compound to form the resinous material are crotonic aldehyde, acrolein, or compounds which generate aldehydes, such as hexamethylene-tetramine, paraldehyde, and the like.

Referring next to the thermosetting acrylic latex, the acrylic latex comprises emulsion polymerized ethylenically unsaturated monomers including functionally reactive monomers. Polymerizable ethylenically unsaturated monomers contain carbon-to-carbon unsaturation and include vinyl monomers, acrylic monomers, allylic monomers, acrylamide monomers, and mono- and dicarboxylic unsaturated acids. Vinyl aromatic hydrocarbons include styrene, methyl styrenes and similar lower alkyl styrenes, chlorostyrene, vinyl toluene, vinyl naphthalene, divinyl benzoate, and cyclohexene; vinyl aliphatic hydrocarbon monomers include alpha olefins such as ethylene, propylene, isobutylene, and cyclohex as well as conjugated dienes such as 1,3-butadiene, methyl-2-butadiene, 1,3-piperylene, 2,3-dimethyl butadiene, isoprene, cyclopentadiene, and dicyclopentadiene; and vinyl alkyl ethers include methyl vinyl ether, isopropyl vinyl ether, n-butyl vinyl ether, and isobutyl vinyl ether. Acrylic monomers include monomers such as lower alkyl esters of acrylic or methacrylic acid having an alkyl ester portion containing between 1 to 12 carbon atoms as well as aromatic derivatives of acrylic and methacrylic acid. Useful acrylic monomers include, for example, acrylic and methacrylic acid, methyl acrylate and methacrylate, ethyl acrylate and methacrylate, butyl acrylate and methacrylate, propyl acrylate and methacrylate, 2-ethyl hexyl acrylate and methacrylate, cyclohexyl acrylate and methacrylate, decyl acrylate and methacrylate, isodecylacrylate and methacrylate, benzyl acrylate and methacrylate, and various reaction products such as butyl, phenyl, and cresyl glycidyl ethers reacted with acrylic and methacrylic acids, hydroxyl alkyl acrylates and methacrylates such as hydroxyethyl and hydroxypropyl acrylates and methacrylates.

Functional monomers include carboxyl, hydroxyl, amino, and amido functional group containing monomers. Carboxy containing monomers include acrylic acid and lower alkyl substituted acrylic acids wherein the preferred carboxylic monomers are acrylic and methacrylic acids. Acrylic acids include acrylic and methacrylic acid, ethacrylic acid, alpha-chloroacrylic acid, alpha-cycanoacrylic acid, crotonic acid, beta-acryloxy propionic acid, and beta-styryl acrylic acid. Hydroxyl containing monomers are hydroxy containing ethylenically unsaturated monomers including hydroxy alkyl acrylates such as 2-hydroxy ethyl acrylate and methacrylate, 2-hydroxypropyl acrylate and methacrylate, and similar hydroxy alkyl acrylates Amino functional monomers are amino acrylates and methacrylates. Amido containing monomers include acrylamide and methacrylamide or similar alkyl alkylol acrylamide monomers. The functional emulsion polymer preferably comprises by weight between about 1% and 20% functional carboxyl monomer, between 30% and 98% acrylic monomer with the balance being other ethylenic monomers. The preferred functional emulsion copolymer comprises copolymerized ethylenically unsaturated monomers on a weight basis between 75% and 98% acrylic monomer, and between 1% and 5% carboxyl monomer to produce an emulsion copolymer having an Acid No. between about 15 and 25, with the balance being other ethylenic monomers. A more preferred copolymer can further contain between 0.5% and 1.5% by weight hydroxyl groups.

To produce the functional emulsion polymer, the ethylenically unsaturated monomers are copolymerized in an aqueous polymerization medium by adding the ethylenic monomers to water along with surfactants and polymerizing catalysts or initiators as well as other emulsion polymerization ingredients. Initiators can include for example, typical free radical and redox types such as hydrogen peroxide, t-butyl hydroperoxide, di-t-butyl peroxide, benzoyl peroxide, benzoyl hydroperoxide, 2,4-dichlorobenzoyl peroxide, t-butyl peracetate, azobisisobutyronitrile, ammonium persulfate, sodium persulfate, potassium persulfate, sodium perphosphate, potassium perphosphate, isopropyl peroxycarbonate, and redox initiators such as sodium persulfate-sodium formaldehyde sulfoxylate, cumene hydroperoxide-sodium metabisulfite, potassium persulfate-sodium bisulfite, cumene hydroperoxide-iron (II) sulfate, etc. The polymerization initiators are usually added in amounts between about 0.1 to 2 weight percent based on the monomer additions.

Referring next to the vinyl acetate-vinyl versetate latex, the vinyl acetate-vinyl versetate copolymer comprises the emulsion polymerization of the respective polymers in the same manner as the acrylic latex is produced. The vinyl acetate-vinyl versetate copolymer comprises by weight between 40% and 90% vinyl acetate and between 10% and 60% vinyl versetate.

The primer/sealer of this invention further contains fatty acid or fatty esters based upon the film-forming solids. The fatty acid and/or ester is unsaturated, having an iodine number above 100, and preferably above 130, and derived from a drying or semi-drying vegetable oil. Typical fatty materials contain two or more double bonds such as linoleic, linolenic, eleostearic acids or single double bond fatty acids such as oleic, docosenoic, or other similar unsaturated fatty acids having 12 to 22 carbon atoms and containing at least one double bond and preferably two conjugated double bonds in the hydrocarbon chain.

Referring next to the polyvinyl alcohol polymer, the polymer is preferably a homopolymer of vinyl alcohol monomer copolymerized to provide a polymer although a copolymer can be used containing very minor amounts up to about 5% of other ethylenically unsaturated monomers containing carbon-to-carbon double bond unsaturation. The polyvinyl alcohol is partially hydrolyzed; preferably 85% to 90% hydrolyzed to provide water dispersion, high solution solids, and film flexibility. Higher molecular weight and larger particle size polymer particles are preferred and are believed to provide surface hold or less absorption into the fibrous hardboard mat prior to and during the hotpressing step.

In accordance with this invention, the primer/sealer coating comprises an aqueous dispersed binder solids comprising by weight between 15% and 40% methoxylated melamine resin, between 30% and 60% thermosetting acrylic copolymer latex, between 5% and 25% vinyl acetate-vinyl versetate copolymer latex, between 3% and 15% emulsified fatty acid, and between 3% and 15% polyvinyl alcohol solids, where the coating can contain pigments and fillers to provide a PVC above about 30% PVC and preferably between 40% PVC and 65% PVC.

The primer/sealer can contain cellulosic stabilizers such as hydroxyethyl cellulose, gum tragacth, algin gums, carboxymethyl cellulose. Nonionic, cationic, and anionic surfactants can be added as dispersing assistants for aqueous solutions. Driers can be added such as cobalt or manganese driers.

The sealer can further contain fillers and/or pigments provided the same are not basic or basic reactive in water. Pigments such as amorphous silica provide a filling action to the sealing properties of the sealer. Pigments can include opacifying pigment such as titanium dioxide or extender pigments such as silica, talc, mica, nonalkaline clays, iron oxides, carbon black, lampblack, graphite and similar pigments. For hardboards to be subsequently painted by electrostatic or similar electrical application, the sealer can contain sufficient electrical application, the sealer can contain sufficient electrically conductive carbon black, graphite, metal powder or conductive resin to provide sufficient conductivity to the electrical applied finish paint coating. Where pigments are added, the pigment loading can give a pigment-volume-content (PVC) above about 30% PVC and preferably between about 40% PVC and 65% PVC.

A typical process for using the primer/sealer of this invention is to apply the primer/sealer by direct roll coater to a surface layer of overlay paper or surface mat at the rate of 1.75 to 2.0. gallons per 1000 ft. Dry the coated paper 3 minutes at 250° F. high velocity air open. The dried paper is then laminated to a waferboard panel in a press with a textured caul plate following a schedule of 3 minutes at 400° F. and 300–500 PSI. Upon opening the press, the laminated board will show no sign of picking or sticking to the press plate. The surface will be hard and dense with good texture fidelity, no cracking on the texture, and complete hiding of the board surface. The primer/sealer of this invention can be applied to the overlay paper or surface mat by conventional application methods, including direct and reverse roll coaters, airless spray, and like methods at volume solids of about 10–50%.

The following examples illustrate the merits of this invention. In all instances the parting of the finished hardboard object form the die or caul plate was substantially perfect. In this specification all parts are parts by weight, and all percentages are weight percentages unless otherwise expressly noted.

EXAMPLE 1

|  | Pounds |
| --- | --- |
| Water | 205.003 |
| Butyl Cellosolve | 5.428 |
| Arysol F-62 dispersing resin | 13.648 |
| triethylamine | 6.196 |
| Tamal 731 | 3.177 |
| Surfynol Tg non-ionic dispersant | .775 |
| Defoamer | 3.689 |
| TiO$_2$ pigment | 49.025 |
| Yellow iron oxide | 3.413 |
| amorphous silica | 375.573 |

EXAMPLE 1 -continued

|  | Pounds |
| --- | --- |
| Rohm & Haas E-2573 acrylic latex | 152.074 |
| vinyl acetate-vinyl versetate latex | 47.190 |
| Astromel NW6A 80% W.S. melamine resin | 54.172 |
| 12% polyvinyl alcohol solution | 94.008 |
| Hydroxyethyl cellulose | 1.976 |
| 80% dimethylamino methyl propanol | 1.154 |
| Tall oil fatty acid | 12.916 |
| Aurasperse Lampblack aqueous dispersion | 1.292 |
| Diatomaceous silica | 19.035 |
| aluminum silicate | 51.156 |

I claim:

1. In a process for manufacturing prefinished hardboard products by hot pressing fibrous materials in a hot press mold, the improvement comprising:

applying an aqueous dispersed primer-sealer composition to a surface layer of overlay paper or surface mat to provide a resin impregnated surface layer, where the primer-sealer composition comprises on a weight basis between about 15% and 40% methoxylated melamine resin, between about 30% and 60% acrylic emulsion copolymer having an Acid N. above about 15, between about 5% and 25% vinyl acetate-vinyl versatate copolymer latex containing copolymerized monomers of 40% to 90% vinyl acetate and 10% to 60% vinyl versatate, between about 3% and 15% emulsified fatty acid having 12 to 22 carbon atoms and an Iodine No. above 100, and between about 3% and 15% polyvinyl alcohols, where the primer-sealer composition contains pigment and the pigment-volume-content (PVC) is above about 30%;

drying the resin impregnated surface layer to produce a dried surface layer;

storing the dried surface layer in layered arrangements without sticking between layers;

removing from storage and laminating the dried surface layer to the surface of a fiberboard composite under pressure and heat to form a prefinished hardboard product having a prefinished surface free of sticking in the hot press.

2. The process of claim 1 where the primer-sealer composition contains pigment and the pigment-volume-content (PVC) is between 40% and 65%.

3. The process of claim 1 where the acrylic emulsion copolymer in the primer-sealer composition has an Acid No. between 15 and 25.

4. The process of claim 1 where the acrylic emulsion copolymer in the primer-sealer composition contains hydroxyl functionality where the acrylic copolymer contains between about 0.5% and 1.5% hydroxyl functional groups.

5. The process of claim 1 where the dried surface layer is stacked in sheets and stored.

6. The process of claim 1 where the dried surface layer is rolled and stored.

* * * * *